Nov. 1, 1955   F. A. TURNER   2,722,673
REMINDER SIGNAL DEVICE
Filed Oct. 23, 1953
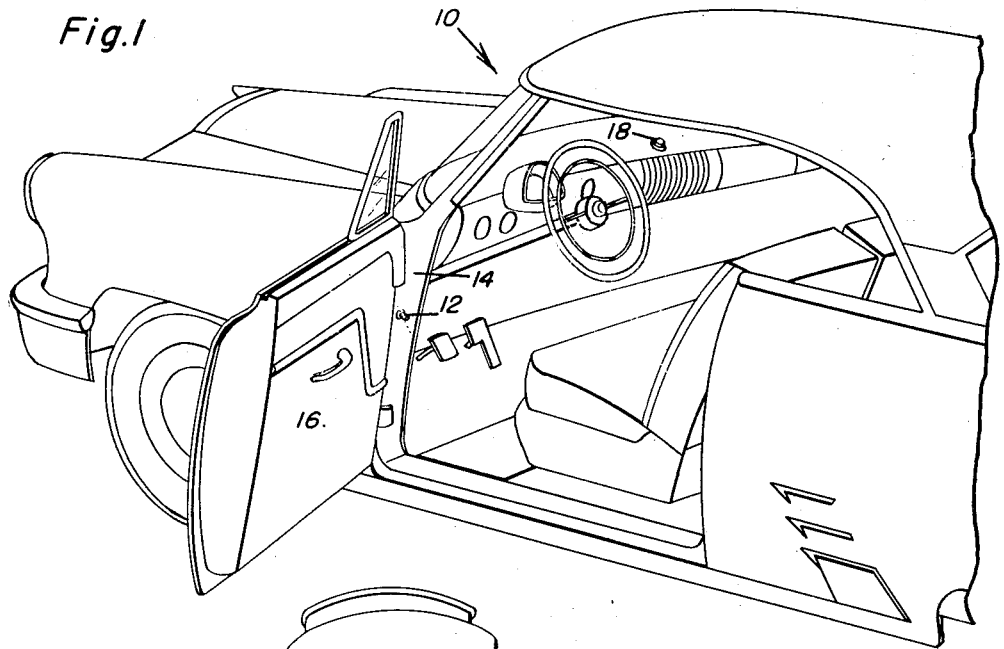
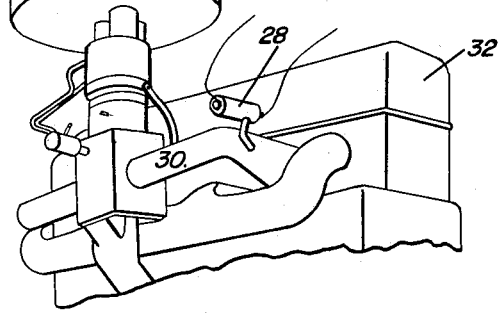
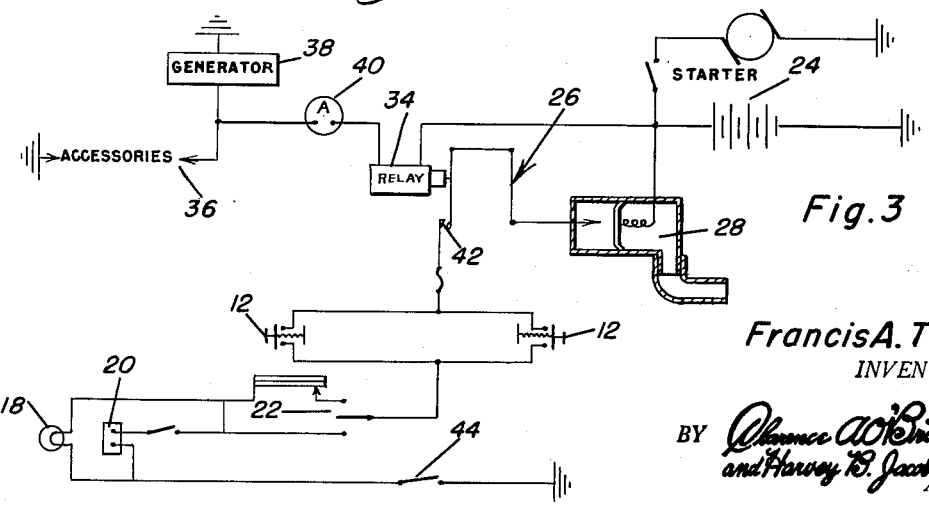
Francis A. Turner
INVENTOR.

United States Patent Office 2,722,673
Patented Nov. 1, 1955

2,722,673

REMINDER SIGNAL DEVICE

Francis A. Turner, Lebanon, Oreg.

Application October 23, 1953, Serial No. 387,934

1 Claim. (Cl. 340—52)

This invention relates to a signal apparatus for an automotive vehicle adapted to inform a motorist about to leave the vehicle that one of the accessories of the vehicle is drawing current, thus providing to the motorist a suitable warning to open the electrical circuit to such accessory to prevent an unnecessary or undesirable drain upon the battery of the vehicle.

The primary object of this invention resides in the provision of a safeguard for the battery of a vehicle whereby an operator of a motor vehicle will be warned by both a visual and audible signal that an accessory is drawing current as the door of the vehicle is opened.

Incorporated in the invention is a flasher device of the conventional bi-metallic thermostatic type, or of such other construction as may be feasible for providing the motorist with an intermittent signal more likely to catch his attention. Inasmuch as the signalling apparatus will be actuated upon any current drain by the accessory circuits of the vehicle, any short circuits will cause the signalling apparatus to function, thus warning motorists that action must be taken in order to avoid excessive current drain on the battery which may prevent the starting of the vehicle at a later period.

Still further objects and features of this invention reside in the provision of a signalling device that may be readily incorporated in various existing makes and models of vehicles, which is simple to install and composed of parts which may be readily manufactured at little expense, and which is so constructed as to have no effect on the proper operation of the engine of the vehicle.

These, together with the various ancillary objects and features of the invention which will become apparent as the following description proceeds, are attained by this signalling device, a preferred embodiment of which has been illustrated in the accompanying drawings, by way of example only, wherein:

Figure 1 is a perspective view, illustrating the manner in which the various elements of the invention are incorporated in an automotive vehicle;

Figure 2 is a perspective view, illustrating the manner of arrangement of the vacuum actuated switch for controlling current flow in the signal supply circuit; and Figure 3 is a wiring diagram of the various electrical components incorporated in this invention.

With continuing reference to the accompanying drawings wherein like reference numerals designate similar parts throughout the various views, reference numeral 10 generally designates an automotive vehicle of any conventional make or model having door actuated switches as at 12 mounted in the door frames 14 and adapted to be operated from a normally closed position to a circuit open position by springs incorporated in the switches which function when the doors 16 of the vehicle are opened.

Incorporated in the invention is a signal lamp 18 together with a buzzer or bell 20 connected in parallel with each other and in series connected with a thermostatic flasher 22 or other suitable current interrupting device for permitting an intermittent flow of current to pass to the visual signalling device 18 and the audible signal mechanism 20.

The signalling apparatus receives its current supply from a conventional battery 24 mounted in the vehicle, and the current supply circuit for the signalling apparatus, which is generally indicated by reference numeral 26, is controlled by a vacuum actuated switch 28 connected to the exhaust manifold 30 of the internal combustion engine 32, the vacuum operated switch 28 interrupting the flow of current from the battery 24, through the supply circuit 26 when the motor 32 is running.

A relay 34 is connected in series connection between the battery 24 and the accessory circuits 36 of the vehicle, and between the generator 38 and ammeter 40 of the vehicle and the battery 24.

Hence, if any current is drawn by the accessory circuits 36, current will flow in the relay 34 which will actuate the set of contacts 42 which further control the signal supply circuit 26.

The operation of this device is quite simple. With any of the accessory circuits 36 drawing current or if there is a short circuit in the electrical equipage of the vehicle in series with the relay 34 and the battery 24, the relay 34 will be excited, closing the contacts 42 of an armature switch in series connection with the switch 28. If the motor is running, the vacuum actuated switch 28 will render the signal supply circuit 26 inoperative, since the operation of the engine 32 is sufficient warning to the motorist that an unsafe condition exists. If the motor 32 is not operating, the vacuum operated switch 28 will be in a circuit closed position. Then, if any of the doors 16 are open, the respective door actuated switch 12 will move to a circuit closed position due to actuation by the springs incorporated therein, thus completing an operative electrical circuit from the battery 24 to the flasher 22 and thence to the signal lamp 18 and bell or buzzer 20. The contacts of the buzzer or bell 20 can be adjusted to sound only upon first actuation and will cease sounding thereafter, the bell 20 being utilized to attract attention initially though the lamp 18 continues to function until the accessories are turned off or until the door is closed.

It is to be noted that any accessories connected to the battery by an automatic switch should not be connected through the relay 34 but should be connected by a separate supply circuit to the battery 24. These special accessories may include courtesy lights operated when the door 16 is opened, a cigarette lighter, stop lights, and such other devices as may be desired to separately connect to the battery 24.

A master control switch 44 may be provided for rendering the signal supply circuit inoperative when it is necessary to perform work upon the vehicle.

Since from the foregoing the construction and advantages of this signalling device are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

A signalling arrangement for an automotive vehicle comprising a relay electrically operatively connected in series connection between the battery of the vehicle and the accessory circuits of the vehicle, said relay being activated when at least one of said accessory circuits is drawing current from said battery, a signal supply circuit connected to said battery, said relay controlling current flow in said signal supply circuit, a vacuum actuated switch further controlling current flow in said signal supply circuit, said vacuum actuated switch being electrically connected in series connection with an armature switch under control of said relay, said signal supply circuit including door operated switches normally open when the doors of the vehicle are closed, said signal supply circuit having incorporated therein a flasher for intermittently closing and opening said signal supply circuit, and audible and visual signals connected to said signal supply circuit.

References Cited in the file of this patent

UNITED STATES PATENTS

| | | |
|---|---|---|
| 2,349,740 | McCollum | May 23, 1944 |
| 2,450,450 | Schmidinger | Oct. 5, 1948 |
| 2,581,338 | La Roza | Jan. 8, 1952 |
| 2,613,258 | Azano | Oct. 7, 1952 |